United States Patent Office 3,378,604
Patented Apr. 16, 1968

3,378,604
VULCANIZABLE COMPOSITION CONTAINING A THIOCARBOXYLIC ACID FLUORIDE POLYMER AND A POLYUNSATURATED COMPOUND
Donald S. Acker, Waynesboro, Va., and Arthur L. Barney, Wilmington, Del., assignors to E. I. du Pont de Nemours and Company, Wilmington, Del., a corporation of Delaware
No Drawing. Continuation-in-part of application Ser. No. 106,512, May 1, 1961. This application May 7, 1965, Ser. No. 454,183
20 Claims. (Cl. 260—874)

This application is a continuation-in-part of our co-pending application Ser. No. 106,512, filed May 1, 1961, now abandoned.

This invention relates to polymeric materials. More particularly, it relates to, and has as its principal objects provision of, vulcanizable, i.e., curable, polymeric compositions, conversion of the same to vulcanized compositions, and the vulcanized products.

The vulcanization, or curing, of certain types of polymeric materials is well known. For example, natural and synthetic rubbers are vulcanized by means of sulfur and metallic oxides. Likewise, certain vinyl polymers that contain hydrogen atoms in their molecules are vulcanized by the use of azo or peroxide compounds that liberate free radicals. Curing occurs because the free radicals abstract hydrogen from the chain to leave free radicals in the chain. Two or more such chains then react with each other. Another form of vulcanization has been described in which solids, including specifically hydrogen-containing polymers such as poly(vinyl acetate), are mechanically interlocked in a three dimensional molecular network formed by polymerization of compounds having at least two polymerizable olefinic double bonds. Thiocarboxylic acid fluoride polymers that have no hydrogen atoms in their molecules form a new class of polymeric materials useful in various applications; such thioacyl fluoride polymers could be used in many other applications if they could be vulcanized or cured to improve their elastomeric properties. However, they do not have the carbon-carbon double bond needed for sulfur cures or the carbon-hydrogen bonds needed for free-radical cures.

A new type of vulcanizable composition and its conversion to novel vulcanized products in which vulcanization is accomplished by chemical bonding, and which have a desirable combination of properties has now been found. The novel vulcanizable compositions of this invention comprise (a) a polymer of a thiocarboxylic acid fluoride having no hydrogen atoms in its molecule, including both homopolymers and inter se copolymers of two or more such thiocarboxylic acid fluorides having thiocarbonyl,

groups, or copolymers of such thioacyl fluorides with hydrogen-free ethylenically unsaturated monomers in which the thioacyl fluoride component amounts to at least 50 mole percent, and (b) 2% to 60% by weight thereof of a compatible, polymerizable, polyunsaturated compound, as defined in greater detail below. The vulcanizable compositions of this invention are cured by subjecting them to free radicals (provided as described in greater detail below) until the polyunsaturated compounds have polymerized. The resulting vulcanized compositions appear to be crosslinked by chemical bonding since they are no longer soluble in the organic solvents in which the unvulcanized thioacyl fluoride polymers are soluble. Other properties of the vulcanized compositions depend to a great extent on the particular thioacyl fluoride polymer employed in the vulcanizable compositions. Vulcanized compositions having properties ranging from those characteristic of rigid plastics to those characteristic of tough elastomers are formed. For example, vulcanized compositions made from poly(thiocarbonyl fluoride) and its copolymers exhibit a desirable combination of elastomeric properties; whereas the vulcanized compositions prepared from poly(trifluorothioacetyl fluoride) and poly(chlorodifluorothioacetyl fluoride) exhibit the properties of a rigid plastic.

The ability of these hydrogen-free polymers to be vulcanized is quite surprising. The hitherto known free-radical vulcanization of polymers has always involved polymers containing hydrogen atoms that could be abstracted from the carbon atoms of the polymer chains by the free-radical catalyst to produce crosslinking in the vulcanized, or cured, polymer, or vulcanization has been achieved by a mechanical interlocking process.

The elastomeric vulcanized compositions are also a part of this invention and they comprise compositions which can be elongated at least 100% and have at least 50% recovery at room temperature in one minute from said elongation, which have a tensile strength at 50° C. that is at least 50% of its strength at 25° C., and which is essentially insoluble in chloroform as evidenced by the fact that it maintains a two-phase system when agitated in 100 volumes of chloroform at room temperature (25° C.) for at least 16 hours.

The vulcanizable compositions of this invention are conveniently prepared by uniformly mixing the thiocarboxylic acid fluoride polymer, e.g., poly(thiocarbonyl fluoride), poly(chlorodifluorothioacetyl fluoride), a copolymer of two or more such thioacyl fluorides, or a copolymer of such a thioacyl fluoride with a copolymerizable hydrogen-free ethylenically unsaturated compound, e.g., tetrafluoroethylene, with 2% to 60% of its weight of a polymerizable, polyunsaturated compound that is compatible with the thioacyl fluoride polymer. Suitable polyunsaturated compounds include, for example, divinylbenzene, trivinylbenzene, divinyldioxane, and trivinyldioxolane. The thioacyl fluoride polymer and the polyunsaturated compound can be mixed together on a rubber mill or they can be dissolved in a mutual solvent, e.g., chloroform. When a chemical source of free radicals, i.e., a free radical-liberating polymerization initiator, is being employed as the initiator in the vulcanizable composition, the free radical-liberating initiator can be incorporated with the polymer and the polyunsaturated compound in the rubber mill or in the solution.

The use of an amount of compatible, polymerizable, unsaturated compound within the range of 2% to 60% of the weight of the thioacyl fluoride polymer is essential in obtaining a vulcanized composition having elastomeric properties. When less than 2% of the polyunsaturated compound is used, insufficient curing of the composition results. When more than 60% of polyunsaturated compound is used, the vulcanized products obtained have progressively more plastic-like properties. The vulcanized products having the best elastomeric properties are obtained when the amount of the polyunsaturated component amounts to 10–25% of the weight of the thioacyl fluoride polymer.

The thiocarboxylic acid fluoride polymers, or macromolecules, used in preparing the vulcanizable compositions of this invention include homopolymers of any hydrogen-free thiocarboxylic acid fluoride, copolymers of any two or more such thioacyl fluorides, or copolymers of such thioacyl fluorides with one or more hydrogen-free copolymerizable ethylenically unsaturated monomers. Specific examples of such thioacyl fluoride polymers that are useful include homopolymers of perhalothioacyl fluorides, e.g., poly(thiocarbonyl fluoride), poly(thiocarbonyl chloride fluoride), poly(trifluorothioacetyl fluoride), poly(pentafluorothiopropionyl fluoride), poly(chlorodifluorothioacetyl fluoride), and poly(pentafluorothio-3-butenoyl fluoride). Specific copolymers that can be used include copolymers of two or more of any of the preceding perhalothioacyl fluorides, or of any of these thioacyl fluorides with one more other hydrogen-free ethylenically unsaturated compounds such as, for example, tetrafluoroethylene and chlorotrifluoroethylene, and especially such copolymers with ethylenically unsaturated compounds containing at least 50 mole percent of the thioacyl fluoride comonomer.

Any polymerizable, polyunsaturated compound that is compatible with the thioacyl fluoride polymer and is capable of polymerizing to high molecular weight addition polymer by suitable initiation can be employed in the vulcanizable compositions of this invention. The preferred polyunsaturated compounds are those which are capable of being vulcanized or cured with any type of free radical-liberating initiator or with ionizing radiation. Specific examples of preferred polyunsaturated compounds include monocyclic carbocyclic aromatic compounds having two or more vinyl substituents, e.g., o-, m-, and p-divinylbenzene, 1,2,4- and 1,3,5-trivinylbenzene; heterocyclic compounds having oxygen as the heteroatom and two or more vinyl substituents, e.g., 2,5-divinyl-1,4-dioxane, 2,6-divinyl-1,4-dioxane (or mixture) and 2,4,5-trivinyldioxolane. Other polyunsaturated compounds that can be mixed with thioacyl fluoride polymers and cured by means of free radicals, but which are less desirable because the vulcanized products do not possess all the desired physical properties, include polyglycol esters of acrylic and methacrylic acids, such as tetraethylene glycol dimethacrylate and triethylene glycol diacrylate.

Certain polyunsaturated compounds, when incorporated in thioacyl fluoride polymers, are capable of producing vulcanized products only when subjected to ionizing radiations. Examples of this type of polyunsaturated compound include methacrylic acid esters of triols, such as glycerol trimethacrylate and 1,2,4-butanetriol trimethacrylate.

As indicated previously, any chemical compound that will decompose at the operating temperature to form free radicals, and which is capable of initiating addition polymerization, can be employed in the curing step of this invention. Specific examples of suitable free radical-liberating initiators include the peroxides and hydroperoxides, e.g., benzoyl peroxide, benzaldehyde peroxide, chlorobenzyl peroxide, t-butyl hydroperoxide, di-t-butyl peroxide, dicumyl peroxide; the azo and diazo compounds such as azonitriles, -esters, -amides, and -amidines, e.g., $\alpha,\alpha'$-azodiisobutyronitrile, $\alpha,\alpha'$ - azobis($\alpha$-cyclopropylpropionitrile), diethyl $\alpha,\alpha'$-azodiisobutyrate, and $\alpha,\alpha'$-azodiisobutyramidine hydrochloride and other azo compounds disclosed in U.S. Patent 2,471,959; and the nitrogen fluorides, e.g., $N_2F_2$. The oxygen in atmospheric air is also operable in the curing of the vulcanizable compositions; however, the rate of curing obtained in this manner is quite slow.

The amount of free radical-liberating polymerization initiator that can be used to obtain curing of the vulcanizable compositions of this invention can be varied widely. Amounts ranging from 0.1% up to 25% of the weight of the thiocarbonyl fluoride polymer in the vulcanizable composition are operable. Amounts ranging between 0.5 and 2% are generally preferred since they give good results.

When the thiocarbonyl fluoride polymer and the compatible polyunsaturated compound are mixed uniformly with the free radical-liberating initiator, e.g., by mixing in a rubber mill or by being dissolved in a mutual solvent followed by evaporation of the solvent, the mixture is ready for curing. This is accomplished by maintaining the vulcanizable composition at the temperature at which the particular free radical-liberating initiator generates free radicals rapidly. The actual temperature, which is dependent on the particular initiator being employed, can range from room temperature, e.g., 20–30° C. up to 100° C. or more. The time required to obtain complete curing of the composition also depends on the particular initiator being employed. A period of time is employed which results in substantially complete decomposition of the initiator. Thus, with an initiator having a half-life of one minute at 100° C., a curing time of 2–3 minutes at 100° C. will be ample. Likewise, when an initiator having a half-life of 4 hours at 38° C. is employed, a curing time of 16–20 hours at 25–30° C. will be ample. There is no need to continue heating the vulcanizable composition for times longer than necessary to obtain decomposition of the initiator. It is not necessary to carry out the curing of the vulcanizable compositions under pressure. However, the use of pressure is often desirable in shaping the vulcanizable composition, e.g., in forming sheets of desired thickness and molded objects of the desired shape and size. Of course, the shaping and curing of the vulcanizable compositions can be carried out simultaneously if desired.

Suitable ionizing radiations for use in vulcanizing or curing the vulcanizable compositions of this invention include both radiation in the form sometimes regarded as particle radiation and radiation in the form sometimes regarded as ionizing electromagnetic radiation.

By particle radiation is meant a stream of particles such as electrons, protons, neutrons, alpha-particles, deuterons, beta-particles, or the like, so directed that the said particles impinge upon the vulcanizable composition. The charged particles may be accelerated by means of a suitable voltage gradient, using such devices as a cathode-ray tube, resonant cavity accelerator, a Van de Graaff accelerator a Cockcroft-Walton accelerator, or the like, as is well known to those skilled in the art. Neutron radiation may be produced by suitable nuclear reactions, e.g., bombardment of a beryllium target with deuterons or alpha-particles. In addition, particle radiation suitable for carrying out the process of this invention may be obtained from an atomic pile or from radioactive isotopes or from other natural or artificial radioactive materials.

By ionizing electromagnetic radiation is meant radiation of the type produced when a metal target (e.g., gold or tungsten) is bombarded by electrons possessing appropriate energy. Such radiation is conventionally termed X-ray. In addition to X-rays produced as indicated above, photons of ionizing electromagnetic radiation suitable for carrying out the process of the invention may be obtained from a nuclear reactor (pile) or from natural or artificial radioactive material. In all of these latter cases, the radiation is conventionally termed gamma rays.

It is recognized that the energy characteristics of one form of ionizing radiation can be expressed in terms which are appropriate for another form. Thus, one may express the energy of either the particles of radiation commonly considered as particle radiation or of the photons of radiation commonly considered as wave or electromagnetic radiation in electron volts (ev.) or in million electron volts (mev.). In the curing process of this invention, radiation consisting of particles or photons having energy of 100 ev. and over may be employed and particles or photons having an energy of 0.001 mev. and over are preferred. With radiation of this type, the vulcanized compositions of this invention can be obtained with a minimum length of exposure to the radiation, permitting maximum efficiency in utilization of the radiation. Particles or photons with an energy equivalent up to 4 mev. are the most useful from a practical standpoint, although radiation with energies of 10 mev. and higher may be employed.

Using a minimum radiation dosage of at least 100 rads is necessary since lower dosages do not give adequate degree of curing. Dosages as high as $10^6$–$10^7$ rads and over may be employed, although dosages in excess of $10^7$ rads are generally to be avoided since they tend to degrade the thioacyl fluoride polymer. Maximum curing is generally obtained at 2-6MM rads, and 1M rad frequently give useful degrees of vulcanization. The exposure may be carried out in one slow pass or in several faster ones and may be conducted at any convenient rate of energy input. One rad is the quantity of radiation which will result in an absorption of 100 ergs per gram of irradiated material.

The thioacyl fluoride polymers used as starting materials in preparing the compositions of this invention can be made by various methods. For example, poly(thiocarbonyl fluoride) can be prepared by polymerizing thiocarbonyl fluoride in bulk or in solution by the use of anionic initiators at temperatures ranging from −180° up to about 0° C. Copolymers of thiocarbonyl fluoride with other copolymerizable thioacyl fluoride monomers are prepared in the same general manner. The preparation of polymers of thiocarbonyl fluoride is disclosed in greater retail in U.S. Patent 2,980,695, application Ser. No. 817,976, filed June 4, 1959, now abandoned, and in application Ser. No. 106,533, filed May 1, 1961, now U.S. Patent 3,240,765 by W. J. Middleton. Polymers of α-fluoroperhalothioacyl fluorides, including homopolymers and inter se copolymers of such monomers are prepared by contacting the monomer or monomer mixture with an anionic initiator at a temperature between 0° and −120° C. in the presence of a solvent such as an ether e.g., diethyl ether or tetrahydrofuran. The preparation of such polymers is described in greater detail in U.S. Patent 3,069,395 by W. J. Middleton. Copolymers of the hydrogen-free thioacyl fluorides with hydrogen-free ethylenically unsaturated monomers are prepared by contacting the monomer mixture with a free radical-liberating initiator, e.g., benzoyl peroxide, di-t-butyl peroxide, dinitrogen difluoride, or α,α'-azodiisobutyronitrile, under anhydrous, oxygen-free conditions at a temperature that liberates free radicals, e.g., 25–135° C., and under elevated pressure, e.g., 1000–3000 atmospheres.

Polyunsaturated compounds used in the compositions of this invention are in general prepared by known methods. 1,2,4-trivinylbenzene can be prepared by treatment of monovinylacetylene with a catalyst comprising titanium tetrachloride and aluminum triisobutyl at temperatures between −65 and +100° C. (U.S. Patent 2,951,884 by F. W. Hoover).

The compositions and process of this invention are illustrated in further detail in the following examples in which the quantities of ingredients are expressed in parts by weight unless otherwise indicated.

Example I

One part of o-divinylbenzene and 0.05 part of benzoyl peroxide are milled into 5 parts of a low molecular weight thiocarbonyl fluoride homopolymer (flows readily under stress) on a small rubber mill at room temperature. The resulting sheet is divided into three portions and these are press-cured using contact pressure at 100° C. for 5, 15 and 45 minutes, respectively. All the cured sheets show evidence of crosslinking. The sample cured for 45 minutes has exceptionally good elastomer properties, e.g., insolubility in chloroform, almost instantaneous recovery when stretched approximately 100% and then released, and retention of these properties at elevated temperatures (50–60° C.) when compared with the original thiocarbonyl fluoride polymer which was quite soluble in chloroform and could not be elongated 50% without tearing.

Example II

Four parts of 1,2,4-trivinylbenzene and 0.18 part of benzoyl peroxide are milled into 36 parts of a high molecular weight (as judged by resistance to deformation when manually stretched) thiocarbonyl fluoride homopolymer on a rubber mill at room temperature (approximately 25° C.). The resulting well-mixed product is preformed in the shape of 0.5" x 5" bars in a positive pressure mold at about 1000 lb./sq. in. and then cured in a 3" x 6" rubber mold at 100° C. for one hour. The physical properties of the vulcanizate are as follows: initial modulus, $M_i$, is 311 lb./sq. in., elongation at break, $E_B$, is 813% and tensile strength at break, $T_B$, is 1860 lb./sq. in. The tensile strength at 100° C. is approximately one-half of that at 25° C.

A portion of the vulcanizate of Example II amounting to 6 parts is exhaustively extracted with triethylamine in a Soxhlet apparatus to degrade the thiocarbonyl polymer chains. After over 24 hours extraction, followed by extensive washing with acetone in the same apparatus, there is a residue of 0.63 part of a powder which contains 9.54% bound sulfur. This indicates that vulcanization is due to chemical bond formation and not simply "mechanical crosslinking."

Example III

A sample of very low molecular weight thiocarbonyl fluoride homopolymer (an oil which is soluble in methylene chloride and is very soluble in chloroform) amounting to one part is mixed with an equal amount of a commercial divinylbenzene consisting of 50–60% of m- and p-divinylbenzenes in alkylstyrenes and alkylbenzenes. This mixture is warmed on a steam bath and benzoyl peroxide is added to start the polymerization. The mixture is heated for one hour and the resulting product is then washed with chloroform and extracted in a Soxhlet apparatus for 7 days with methylene chloride and then for 7 more days with chloroform. The residue from the extraction contains 33.20% sulfur and this indicates a high proportion of insolubilized thiocarbonyl fluoride polymer. The residue is micropulverized at −80° C. and the resulting powder is extracted for 7 days with chloroform in a Soxhlet apparatus. The amount of material removed by extraction is too small to collect. The residue analyzes 33.18% S. These results show there is no separation of thiocarbonyl fluoride from divinylbenzene polymers, and prove that divinylbenzene is chemically bound to the thiocarbonyl polymer during curing.

Examples IV–VII

Six-part portions of high molecular weight thiocarbonyl fluoride polymer are milled on a rubber mill at room temperature (approximately 25° C.) while 1,2,4-trivinylbenzene (TVB) and benzoyl peroxide are added in the amounts shown in Table I below. The well-mixed samples are taken from the rubber mill and cured in a positive pressure mold at 100° C. for one hour at pressures varying from 2000 to 10,000 lb./sq. in. Tensile data on these vulcanizates, determined at 25° C., are also given in Table I.

TABLE I

| Ex. | TVB, Percent (Based on CF$_2$S Polymer) | Peroxide, Percent (Based on TVB) | $E_B$, Percent | $T_B$, lb./sq. in. | $M_i$, lb./sq. in. |
|---|---|---|---|---|---|
| IV | 20 | 5 | 630 | 1,948 | 753 |
| V | 30 | 3.3 | 590 | 2,165 | 826 |
| VI | 40 | 2.5 | 475 | 2,104 | 1,805 |
| VII | 40 | 5.0 | 465 | 1,768 | 2,414 |

Example VIII

Commercial divinylbenzene, 1.25 parts (containing 50–60% of m- and p-divinylbenzenes), and 0.05 part of α,α'-azodiisobutyronitrile are milled into 5 parts of thiocarbonyl fluoride polymer on a rubber mill at room temperature (approximately 25° C.). The resulting product is cured in a positive pressure mold at 1500 lb./sq. in. and 100° C. for one hour. The cured product has the following tensile properties: $E_B$=710%, $T_B$=3903 lb./sq. in., and $M_i$=3222 lb./sq. in.

A poly(thiocarbonyl fluoride)-divinylbenzene composition prepared as described in Example VIII is cured under the same conditions into pellets ¾" in diameter by ½" long for determination of the resilience of the cured composition. When tested in a Yerzley oscillograph at room temperature (ASTM Method D–945), the composition exhibits a resilience value of 70.1%. Various natural rubber compositions exhibit resilence values of 60–80% in the same test. Another sample of thiocarbonyl fluoride homopolymer cured in the same way exhibits a resilience value of 84%.

When the composition described in the preceding paragraph is tested for heat build-up (ASTM Method D–623) at 1800 cycles per minute, 3/16" stroke, 150 lb./sq. in. for 20 minutes, the composition has a ΔT of 22° C. with a final internal temperature of 134° C. Two natural rubber samples exhibited ΔT values of 39–40° C. and final internal temperatures of 98–108° C.

The cured composition of the preceding paragraphs also exhibits outstanding compression set values (ASTM D–395—Method A). In this test, compression set values of 6.2% at 70° C. for 22 hours and 15.7% at 100° C. for 70 hours are obtained.

Example IX

A slab of thiocarbonyl fluoride polymer containing 25% of commercial divinylbenzene is prepared by milling the ingredients on a rubber mill and forming a sheet in a positive pressure mold. This slab is then passed once through a beam of 2 mev. electrons (125 microamps) at −80° C. The cured slab has the following tensile properties: $E_B=703\%$, $T_B=2159$ lb./sq. in. and $M_i=8492$ lb./sq. in.

Example X

To 150 parts of a chloroform solution of poly(thiocarbonyl fluoride) containing 2 parts of polymer are added 0.3 part of o-divinylbenzene and 0.1 part of $\alpha,\alpha'$-azodiisobutyronitrile. The chloroform is evaporated under reduced pressure and the residue is pressed between an aluminum foil in a press at 125° C. for one hour at contact pressure.

In contrast to the original thiocarbonyl fluoride polymer, the cured product shows a much better tendency to resist crystallization and setting when drawn 200–300%. It also shows greater strength when held under stress at 60° C. than does the original polymer. Both of these changes in properties indicate that vulcanization has taken place.

Example XI

To a solution of 16 parts of a copolymer of thiocarbonyl fluoride and chlorodifluorothioacetyl fluoride (containing approximately 95 mole percent thiocarbonyl fluoride) dissolved in 360 parts of chloroform are added 4 parts of commercial divinylbenzene (50–60% of a mixture of m- and p-divinylbenzenes) and 0.08 part of $\alpha,\alpha'$-azodiisobutyronitrile. The chloroform is removed, keeping the temperature of the polymer at 5–15° C. A soft pliable mass is obtained which is heated in a 3" x 3" mold at 100° C. for one hour under 2000 lb./sq. in. pressure. A homogeneous elastic molding is obtained that has a tensile strength, $T_B=842$ lb./sq. in., $E_B=687\%$ and $M_i=390$ lb./sq. in. The cured product shows much greater resistance to flow than does the uncured original polymer.

Example XII

To a solution of 2 parts of a copolymer of thiocarbonyl fluoride and pentafluorothio-3-butenoyl fluoride (containing approximately 98 mole percent of thiocarbonyl fluoride) in 150 parts of chloroform are added 0.5 part of commercial divinylbenzene (containing 50–60% m- and p-divinylbenzenes) and 0.01 part of $\alpha,\alpha'$-azodiisobutyronitrile. The chloroform is removed under reduced pressure, keeping the solution at 5–15° C. The residue is transferred to a 1" x 3" mold and is heated at 100° C. for one hour under 2000 lb./sq. in. pressure. An elastic molding is obtained that has a $T_B$ of 1284 lb./sq. in., $E_B$ of 845% and $M_i$ of 480 lb./sq. in. In contrast to the uncured copolymer, the cured product recovers completely from stretching to about 100%.

Example XIII

To a solution of 1 part of poly(thiocarbonyl chlorofluoride) in 149 parts of chloroform are added 0.25 part of commercial divinylbenzene (50–60% m- and p-divinylbenzenes) and 0.01 part of $\alpha,\alpha'$-azobis($\alpha$-cyclopropylpropionitrile). The chloroform is removed from this solution at reduced pressure without heating and the residue is press-cured at 30° C. for 20 hours at contact pressure. The resulting clear elastomer does not dissolve in chloroform.

Example XIV

The procedure of Example XIII is repeated with the exception that the poly(thiocarbonyl chlorofluoride) is replaced by poly(chlorodifluorothioacetyl fluoride). The resulting cured composition is no longer soluble in chloroform and it is a soft plastic.

Example XV 2,4,5-trivinyldioxolane, 1.25 parts, and 0.05 part of $\alpha,\alpha'$-azodiisobutyronitrile are milled into 5 parts of poly(thiocarbonyl fluoride) on a rubber mill at room temperature. This milled composition is cured in a positive pressure mold at 100° C. for one hour at 1500 lb./sq. in. pressure. The cured product has the following physical properties: $E_B=760\%$, $T_B=542$ lb./sq. in. and $M_i=254$ lb./sq. in.

Example XVI

The procedure of Example XV is repeated with the exception that a mixture of 2,5- and 2,6-divinyl-1,4-dioxanes is substituted for the trivinyldioxolane. The vulcanized elastomer which is produced has the following physical properties: $E_B=465\%$, $T_B=285$ lb./sq. in. and $M_i=227$ lb./sq. in.

Example XVII

A sample of poly(thiocarbonyl fluoride) (1.0 part) into which 20% of its weight of 1,2,4-trivinylbenzene has been milled on a rubber mill and then pressed into a sheet at 100° and 12,000 lb./sq. in. pressure is subjected to approximately 0.040 part of dinitrogen difluoride for 10 minutes at 55–70° C. The resulting product has the properties typical of cured poly(thiocarbonyl fluoride).

Example XVIII

A mixture of 1.25 parts of commercial divinylbenzene (50–60% of m- and p-divinylbenzenes) and 0.05 part of $\alpha,\alpha'$-azodiisobutyronitrile is milled into 5 parts of poly(thiocarbonyl fluoride) on a rubber mill at room temperature. This milled product is cured in a positive pressure mold at 100° C. under 11,100 lb./sq. in. pressure for one hour. The cured elastomeric composition has the tensile properties listed in Table II. This table also contains the tensile properties of a sample of the uncured poly(thiocarbonyl fluoride), which was pressed in a positive pressure mold at 150° C. under 2100 lb./sq. in. pressure for 2 hours, for purposes of comparison.

TABLE II

| Tensile Properties at Indicated Temperature | Uncured | Cured |
| --- | --- | --- |
| At 25° C.: | | |
| $E_B$, percent | 404 | 423 |
| $T_B$, lb./sq. in. | 533 | 1,235 |
| At 50° C.: | | |
| $E_B$ percent | 70 | 445 |
| $T_B$, lb./sq. in. | 155 | 1,008 |
| At 70° C.: | | |
| $E_B$, percent | 57 | 390 |
| $T_B$, lb./sq. in. | 123 | 735 |
| At 100° C.: | | |
| $E_B$, percent |  | 348 |
| $T_B$, lb./sq. in. |  | 593 |

Example XIX

A mixture of 1.25 parts of commercial divinylbenzene, 0.05 part of $\alpha,\alpha'$-azodiisobutyronitrile and 5 parts of poly(thiocarbonyl fluoride) is milled on a rubber mill at room temperature. During the milling, sufficient xylene is added to improve the milling characteristics of the composition. The milled composition is cured in the form of a sheet ¼" thick in a circular mold 5" in diameter under a pressure of 1500 lb./sq. in. at 100° C. for one hour. Samples cut from the cured sheet are tested for abrasion resistance in a National Bureau of Standards abrader. The average of four separate tests shows the composition to have abrasion resistance sixteen times better than that of natural rubber.

Example XX

One hundred parts of poly(thiocarbonyl fluoride) is ground to pass through a 30-mesh screen and the finely divided polymer is mixed at room temperature with a solution prepared from 25 parts of commercial divinylbenzene, 1 part of $\alpha,\alpha'$-azodiisobutyronitrile and 750 parts of chloroform until a uniform gel is obtained. The chloroform is then removed from the gel by evaporation under reduced pressure and the polymer cake is broken into crumbs on the rubber mill. A 6" x 6" sheet is formed from the crumbs by pressing at 100° C. for one hour under a total pressure of 35 tons. Disks ¾" in diameter cut from the cured sheet are tested for tear resistance in an Inston tester. Tear resistance values of 90–92 lb./in. are exhibited by the composition. For comparison, natural rubber has a tear value of 62 lb./in. and commercial styrene-butadiene rubber has a tear value of 46 lb./in. when tested by the same method.

Example XXI

A sheet of poly(thiocarbonyl fluoride) is immersed in o-divinylbenzene for 2 days. Portions of the swollen sheet are then passed three times through a beam of 2 mev. electrons (125 microamps) at temperatures of —80° C., 25° C., and 60° C. In each case, the elastomeric character of the polymer is improved by the irradiation as judged by hand testing, with the elastomeric character of the sample irradiated at —80° C. being greatly improved.

Example XXII

A sheet of poly(thiocarbonyl fluoride) is immersed in 1,2,4-trivinylbenzene for 1 hour. The swollen sheet is then passed three times through a beam of 2 mev. electrons (125 microamps) at —80° C. The resultant polymer is a crosslinked elastomer.

The vulcanizable and vulcanized compositions of this invention can also include other additives. For example, they can be modified with additives such as other rubbers, e.g., natural rubber, styrene-butadiene, chloroprene, butadiene-acrylonitrile and other synthetic rubbers. They can also contain fillers such as carbon black or silica in the proportions commonly employed in rubber applications.

The vulcanized thioacyl fluoride elastomeric compositions of this invention are useful in various applications because of the particular combination of properties they possess. Since the elastomers of this invention possess an elongation of at least 100% with at least 50% recovery in one minute at room temperature and have a tensile strength at 50° C. that is at least 50% of the tensile strength at 25° C., the thioacyl fluoride elastomers of this invention are particularly useful in various elastomer applications.

The cured thiocarboxylic acid fluoride polymer compositions are particularly suitable for use in the manufacture of elastomeric fibers which are in turn useful in the manufacture of stretchable fabrics which are used in a wide variety of applications. Thus, the cured compositions can be fabricated into articles such as surgical stockings, etc. The particular properties which make these cured polymers useful for this purpose are the low stress decay, high tensile recovery and high modulus ratio values that they exhibit.

In addition to their use in elastic fibers, the cured elastomers are also useful in forms other than fibers such as, for example, in the form of elastic films, elastic coatings for other films and for fabrics, flexible sheeting and tubing, and the like. In their application as coatings the vulcanizable compositions of this invention can be applied to a substrate and then cured to form the insoluble elastomeric coating.

The vulcanized thioacyl fluoride compositions which are rigid plastics are also useful in various applications. In particular, the cured rigid plastics are useful for the manufacture of films, sheeting, molded objects and coating compositions.

Since obvious modifications and equivalents in the invention will be evident to those skilled in the chemical arts, we propose to be bound solely by the appended claims.

The embodiments of the invention in which an exclusive property or privilege is claimed are defined as follows:

1. The process of curing a polymer of at least one hydrogen-free thiocarboxylic acid fluoride which comprises reacting the same, in the presence of a member of the group consisting of free radical-liberating polymerization initiators and ionizing radiation, with
2 to 60% by weight, based on the weight of the polymer, of a polyunsaturated composition consisting of at least one compound of the group consisting of monocyclic carbocyclic aromatic compounds having at least two vinyl substituents, heterocyclic compounds having oxygen as the heteroatom and at least two vinyl substituents, and polyglycol esters of acrylic and methacrylic acids,
said polymer being of the class consisting of the homopolymers of the acid fluorides, the inter se copolymers thereof, and the copolymers of the same with at least one hydrogen-free ethylenically unsaturated monomer, said copolymers containing at least 50 mole percent of thiocarboxylic acid fluoride moiety.

2. The process of claim 1 wherein the polymer is poly(thiocarbonyl fluoride).

3. The process of claim 1 wherein the polymer is a copolymer of thiocarbonyl fluoride and chlorodifluorothioacetyl fluoride.

4. The process of claim 1 wherein the polymer is a copolymer of thiocarbonyl fluoride and pentafluoro-3-butenoyl fluoride.

5. The process of claim 1 wherein the polymer is poly(thiocarbonyl chloride fluoride).

6. The process of claim 1 wherein the polymer is poly(chlorodifluorothioacetyl fluoride).

7. The process of claim 1 wherein the polyunsaturated composition includes a divinylbenzene.

8. The process of claim 1 wherein the polyunsaturated composition includes a trivinylbenzene.

9. A composition of matter consisting of a polymer of a hydrogen-free thiocarboxylic acid fluoride cured by reaction with
2 to 60% by weight, based on the weight of the polymer, of a polyunsaturated composition consisting of at least one compound of the group consisting of monocyclic carbocyclic aromatic compounds having at least two vinyl substituents, heterocyclic compounds having oxygen as the heteroatom and at least two vinyl substituents, and polyglycol esters of acrylic and methacrylic acids,
said polymer being of the class consisting of the homopolymers of the acid fluoride, the inter se copolymers thereof, and the copolymers of the same with at least one hydrogen-free, ethylenically unsaturated monomer, said copolymers containing at least 50 mole percent of thiocarboxylic acid fluoride moiety.

10. The composition of matter of claim 9 wherein the polymer is poly(thiocarbonyl fluoride).

11. The composition of matter of claim 9 wherein the polymer is a copolymer of thiocarbonyl fluoride and chlorodifluorothioacetyl fluoride.

12. The composition of matter of claim 9 wherein the polymer is a copolymer of thiocarbonyl fluoride and pentafluoro-3-butenoyl fluoride.

13. The composition of matter of claim 9 wherein the polymer is poly(thiocarbonyl chloride fluoride).

14. The composition of matter of claim 9 wherein the polymer is poly(chlorodifluorothioacetyl fluoride).

15. A vulcanizable composition of matter consisting essentially of a mixture of:
   (1) at least one hydrogen-free polymer of the group consisting of the homopolymers of hydrogen-free thiocarboxylic acid fluorides, the inter se copolymers of said acid fluorides, and the copolymers of the same with at least one hydrogen-free ethylenically unsaturated monomer, said copolymers containing at least 50 mole percent of thiocarboxylic acid fluoride moiety; and
   (2) 2 to 60% by weight, based on the weight of the polymer, of a polyunsaturated composition consisting of at least one compound of the group consisting of monocyclic carbocyclic aromatic compounds having at least two vinyl substituents, heterocyclic compounds having oxygen as the heteroatom and at least two vinyl substituents, and polyglycol esters of acrylic and methacrylic acids.

16. A composition of claim 15 containing additionally a free radical-liberating polymerization initiator.

17. A composition of claim 15 wherein the hydrogen-free polymer is poly(thiocarbonyl fluoride).

18. A composition of claim 15 wherein the hydrogen-free polymer is a copolymer of thiocarbonyl fluoride and chlorodifluorothioacetyl fluoride.

19. A composition of claim 15 wherein the hydrogen-free polymer is a copolymer of thiocarbonyl fluoride and pentafluoro-3-butenoyl fluoride.

20. A composition of claim 15 wherein the hydrogen-free polymer is poly(thiocarbonyl chloride fluoride).

References Cited

UNITED STATES PATENTS

| | | | |
|---|---|---|---|
| 2,155,591 | 4/1939 | Garvey | 260—886 |
| 3,069,395 | 12/1962 | Middleton | 260—79 |

MURRAY TILLMAN, *Primary Examiner.*

D. J. BREZNER, M. J. TULLY, *Assistant Examiners.*